(12) United States Patent
Steenbakkers-Menting et al.

(10) Patent No.: US 7,323,504 B2
(45) Date of Patent: Jan. 29, 2008

(54) HALOGEN-FREE FLAME RETARDER COMPOSITION AND FLAME RETARDANT POLYAMIDE COMPOSITION

(75) Inventors: Henrica Norberta Alberta Maria Steenbakkers-Menting, Susteren (NL); Johannes Tijssen, Beek (NL); Daniël Joseph Maria Tummers, Geleen (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 43 days.

(21) Appl. No.: 10/380,571

(22) PCT Filed: Oct. 4, 2001

(86) PCT No.: PCT/NL01/00733
§ 371 (c)(1),
(2), (4) Date: Jul. 7, 2003

(87) PCT Pub. No.: WO02/28953
PCT Pub. Date: Apr. 11, 2002

(65) Prior Publication Data
US 2004/0021135 A1    Feb. 5, 2004

(30) Foreign Application Priority Data
Oct. 5, 2000    (NL) .................... 1016340

(51) Int. Cl.
*C08K 5/5313*    (2006.01)
(52) U.S. Cl. ............. 524/133; 524/99; 524/100; 524/101; 252/609
(58) Field of Classification Search ........... 252/609; 524/99–101, 133
See application file for complete search history.

(56) References Cited

U.S. PATENT DOCUMENTS 4,208,321 A    6/1980   Sandler ............ 260/45.75
6,136,973 A  * 10/2000  Suzuki et al. ........ 544/195
6,255,371 B1 *  7/2001  Schlosser et al. ..... 524/100
6,503,969 B1 *  1/2003  Klatt et al. ......... 524/133
2006/0106139 A1 * 5/2006 Kosaka et al. ........ 524/90

FOREIGN PATENT DOCUMENTS

| CA | 2250995 A1 * | 10/1997 |
| WO | 97/39053 | 10/1997 |
| WO | WO 9839306 A1 * | 9/1998 |
| WO | WO 9845364 A1 * | 10/1998 |
| WO | WO 9957187 A1 * | 11/1999 |
| WO | WO 0002869 A1 * | 1/2000 |
| WO | 00/09606 | 2/2000 |

* cited by examiner

Primary Examiner—Peter Szekely
(74) Attorney, Agent, or Firm—Shiela A. Loggins

(57) ABSTRACT

The invention relates to a halogen-free, flame retarder composition for use in a thermoplastic composition, in particular a glassfibre-reinforced polyamide composition, which flame retarder composition contains at least 10-90 mass % phosphinate compound according to formula (I) and/or formula (II) and/or polymers thereof and 90-10 mass % polyphosphate salt of a 1,3,5-triazine compound according to formula (III) and 0-30 mass % olefin copolymer. When used as a flame retarder in glassfibre-reinforced compositions the halogen-free flame retardant composition results in a combination of a V-0 rating according to the UL 94 test of Underwriters Laboratories and excellent mechanical properties. The invention therefore also relates to the use of this flame retarder composition as a flame retarder in a polyamide composition, and a flame retardant polyamide composition that contains the flame retarder composition. The invention also relates to a moulded article containing the flame retardant polyamide composition, and the use thereof in the field of electrical and electronic applications.

12 Claims, No Drawings

HALOGEN-FREE FLAME RETARDER COMPOSITION AND FLAME RETARDANT POLYAMIDE COMPOSITION

The invention relates to a halogen free, flame retarder composition. The invention also relates to the use of this flame retarder composition as a flame retarder in a thermoplastic composition, in particular a glassfibre-reinforced polyamide composition, and a flame retardant polyamide composition that contains the flame retarder composition. The invention also relates to a moulded article containing the flame retardant polyamide composition, and the use thereof in the field of electrical and electronic applications.

Such a flame retarder composition is known inter alia from patent application WO 9739053 A1. Said publication describes a flame retarder composition for a thermoplastic, in particular for a polyester, which composition contains a metal phosphinate and a nitrogen compound. Also, non-reinforced flame retardant polyamide compositions are described that contain the aluminium salt of methyl ethyl phosphinic acid and melamine cyanurate or melamine phosphate.

A disadvantage of the known flame retarder composition is that when used in glassfibre-reinforced polyamide compositions they do not yield the desired combination of flame retardancy according to the UL 94 or UL 756A tests of Underwriters Laboratories and good mechanical properties.

The aim of the invention is therefore to meet the need for a halogen-free, flame retarder composition for a polyamide composition, in particular a glassfibre-reinforced polyamide composition, which does not have the said disadvantages, or at least has them to a strongly reduced extent.

The inventors have found now that a flame retarder composition, which contains at least a) 10-90 mass % phosphinate compound according to formula (I) and/or formula (II) and/or polymers thereof;

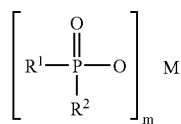

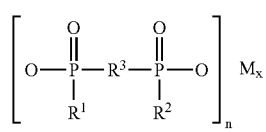

in which

R$^1$, R$^2$ is hydrogen, a linear or branched C$_1$-C$_6$alkyl radical, or a phenyl radical;

R$^3$ is a linear or branched C$_1$-C$_{10}$ alkylene, arylene, alkylarylene, or arylalkylene radical;

M is an alkaline earth metal or alkali metal, Al, Zn, Fe, or a 1,3,5-triazine compound;

m is 1, 2 or 3;

n is 1 or 3;

x is 1 or 2; and b) 90-10 mass % polyphosphate salt of a 1,3,5-triazine compound according to formula (III),

in which T represents a 1,3,5-triazine compound; and
n is a measure of the number average degree of condensation and is larger than 3;

c) 0-30 mass % olefin copolymer; with the sum of a)-c) being 100% meets this need.

The component c) is an optional synergistic component, as described hereinafter.

When used as a flame retarder in glassfibre-reinforced polyamide compositions, the halogen-free flame retarder composition makes it possible to obtain the desired combination of a V-0 rating according to the UL 94 test of Underwriters Laboratories and good mechanical properties.

A polyphosphate of a 1,3,5-triazine compound is hereinafter also referred to as melamine polyphosphate.

A flame retardant polyester composition that contains a metal phosphinate and a nitrogen compound, including melamine polyphosphate, is known from WO 9957187 A1. The use of melamine polyphosphate as a component in a flame retardant for polymer compositions is also described in WO 0002869 A1, but this publication teaches nothing about a combination with a phosphinate compound. Although in WO 0009606 A1 use of melamine phosphates is disclosed in combination with an alkaline earth metal salt in polyester and polyamide compositions, this publication is silent on using said phosphinate compounds.

When n is high, melamine polyphosphate can be represented also by the formula $(THPO_3)_n$. Theoretically, the structure is linear if the T/P (triazine/phosphorus) ratio is equal to around 1. If T/P is smaller than 1 the product is cross-linked. At T/P<0.4 a network structure is formed. Preferably use is made of a melamine polyphosphate for which the number average degree of condensation n is higher than 20, n more preferably being higher than 40. The advantage of this is that a moulded article made from a polyamide composition containing the flame retarder composition shows less blooming. The 1,3,5-triazine content is preferably higher than 1.1 mole, and more preferably higher than 1.2 moles, of 1,3,5-triazine per mole of phosphorus atom. The number average degree of condensation n will generally be lower than 200, n in particular being lower than 150. The 1,3,5-triazine content is generally less than 2 moles of triazine per mole of phosphorus atom and preferably less than 1.8. The advantage of such a melamine polyphosphate is for example that it can be applied in polymer compositions that are processed at a high temperature. Such polymer compositions have an excellent thermal stability. Such a melamine polyphosphate and its preparation are described in WO 0002869 A1.

Examples of suitable 1,3,5-triazine compounds in the polyphosphate of a 1,3,5-triazine compound are 2,4,6-triamine-1,3,5-triazine (melamine), melam, melem, melon, ammeline, ammelide, 2-ureidomelamine, acetoguanamine, benzoguanamine, diamine phenyltriazine or mixtures thereof. Melamine, melam, melem, melon or mixtures thereof are preferred and more in particular melamine is preferred.

Phosphinate compounds are here understood to be compounds according to formulas (I) and (II) as well as polymers thereof. The flame retarder composition according to the invention preferably contains a phosphinate compound in which $R^1$ and $R^2$ are a linear or branched C1-C6 alkyl radical or phenyl. The advantage of this is a better stability of the compound.

The flame retarder composition according to the invention preferably contains a phosphinate compound of Ca, Al or Zn. An advantage of this is that less polymer degradation takes place in the polyamide composition during preparation and processing of the flame retardant polyamide composition. More preferably the flame retarder composition contains a zinc phosphinate compound, because glassfibre-reinforced polyamide compositions containing this flame retarder show a better toughness, e.g. higher elongation at break, combined with flame retardancy. The good result obtained with a zinc phosphinate compound is surprising, because publication EP 0792912 A teaches that particularly in a polyamide composition a zinc phosphinate compound does not have a good flame retardant activity. Examples of suitable 1,3,5-triazine compounds in the phosphinate compound in the flame retarder composition according to the invention are 2,4,6-triamine-1,3,5-triazine (melamine), melam, melem, melon, ammeline, ammelide, 2-ureidomelamine, acetoguanamine, benzoguanamine, diamine phenyltriazine or mixtures thereof. Melamine, melam, melem, melon or mixtures thereof are preferred and more in particular melamine and/or melam is preferred.

The phosphinate compounds can be prepared using known processes, for example by reaction in an aqueous solution of a metal salt with a phosphinic acid, as described inter alia in EP-A-0699708. Preparation of triazine phosphinate is described in WO 0157051 A. Examples of suitable phosphinic acids are dimethyl phosphinic acid, ethyl-methyl phosphinic acid, diethyl phosphinic acid, methyl-n-propylphosphinic acid, methane-di(methylphosphinic acid), benzene-1,4-(dimethyl phosphinic acid), methyl-phenylphosphinic acid, diphenylphosphinic acid.

The flame retarder composition according to the invention preferably contains 25-75 mass % phosphinate compound and 75-25 mass % polyphosphate salt of a 1,3,5-triazine compound. More preferably the flame retarder composition according to the invention contains the phosphinate compound and the polyphosphate salt of a 1,3,5-triazine compound in a mass ratio of smaller than 1.0, more preferably smaller than 0.9, even more preferably smaller than 0.8. The advantage of this is that a further improvement in the balance between flame retardancy and mechanical properties, esp. toughness is obtained, specifically in a polyamide composition. Said mass ratio is preferably larger than 0.33, more preferably larger than 0.5, in order to retain good fire behaviour. Most preferably, a ratio of about 2/3 is chosen, because a glassfibre-reinforced polyamide composition containing this flame retarder shows an excellent balance of fire behaviour and mechanical properties, with even the highest PLC rating in a Hot Wire Ignition test.

Preferably the flame retarder composition according to the invention also contains 1-30 mass % olefin copolymer. An olefin copolymer is here understood to be a polymeric compound on the basis of at least one olefin with 2-12 carbon atoms and 0.1-30 weight % (calculated on the weight of the polymeric compound) of at least one compound containing acid, acid anhydride or epoxy groups. This has the advantage that when the flame retarder composition is used in a thermoplastic composition, this results not only in a better toughness, for example a higher elongation at break, but also, surprisingly, in better flame retardancy. The better flame retardancy is for example manifested in the form of shorter flaming combustion times in the UL 94 test, so that a better rating is obtained at the same concentration of phosphinate compound and melamine polyphosphate, or use can be made of lower concentrations of the flame retarder composition. This effect of an olefin copolymer is surprising, because in itself such a polymeric compound is not known to be a flame retardant. Copolymers of ethylene, propylene or ethylene-propylene with 0.1-30 mass % (calculated on the mass of the copolymer) of a comonomer containing acid, acid anhydride or epoxy groups can be considered as suitable olefin copolymers. The said copolymers may also contain comonomers that do not contain said groups, for example acryl esters or vinyl acetate. Preferably the copolymer contains 0.5-12 mass % (calculated on the mass of the copolymer) of a compound containing acid, acid anhydride or epoxy groups. Examples of such compounds are acrylic acid, methacrylic acid, maleic anhydride, glycidyl acrylate and glycidyl methacrylate. Preferably the copolymer contains an acid or acid anhydride group. This has the advantage that these groups can react with for example terminal amine groups of a polyamide in a polyamide composition. Examples of commercially available suitable olefin copolymers are propylene/maleic anhydride (Himont), propylene/acrylic acid (Polybond®, BP Chemical) and maleic anhydride-modified ethylene/alpha-olefin copolymer (Tafmer®, Mitsui). Good results were obtained with an ethylene-propylene copolymer modified with 0.5 wt. % maleic anhydride (Tafmer®, Mitsui).

The invention also relates to the use of the flame retarder composition according to the invention as a flame retarder in a thermoplastic composition. As thermoplastic polymer a wide variety of polymers can be used. The flame retarder composition according to the invention is especially of advantage for polymers that require heat-resistant flame retarders, such as for example polyamides, polyesters, polyimides, polyurethanes, and blends thereof. More preferably, the flame retarder composition according to the invention is used in a glassfibre-reinforced polyamide composition.

The invention more specifically relates to a flame retardant polyamide composition that contains the following components:
 a) 95-10 mass % polyamide;
 b) 0-50 mass % glass fibre;
 c) 5-40 mass % flame retarder composition according to the invention;
 d) 0-50 mass % other additives;
the sum of components a)-d) being 100 mass %.

Preferably the flame retardant polyamide composition contains 10-40 mass % glass fibre. The advantage of this composition over known polyamide compositions is that the composition according to the invention, besides e.g. a V-0 rating according to UL 94, also shows good mechanical properties, particularly a high breaking strength and a high elongation at break, as measured for example in a tensile test according to ISO 527-1.

Good results have been obtained in particular with a flame retardant polyamide composition according to the invention that contains 10-35 mass % flame retarder composition. Preferably the polyamide composition contains 15-30 mass % flame retarder composition. The most suitable concentration will depend amongst other things on the nature and concentrations of the other components in the polyamide composition and can in principle be determined experimentally by one skilled in the art. Preferably, the polyamide composition contains such an amount of the flame retarder composition that the content of melamine polyphosphate is more than 10 mass %, more preferably more than 12 mass % based on total composition.

Examples of suitable polyamides are polyamides and copolyamides derived from diamines and dicarboxylic acids and/or from amino carboxylic acids or the corresponding lactams, including aliphatic polyamides such as polyamide 4 (PA 4), PA 6, PA 66, PA 6.10, PA 6.9, PA 6.12, PA 46, PA 66/6, PA 6/66, PA 11, PA 12, and semi-aromatic polyamides such as PA 6/6T, PA 66/6T, PA 6/66/6T, PA 66/6I/6T, and mixtures thereof. Preferably polyamide 6, PA 66 or PA 46 are chosen. Suitable polyamides have a relative solution viscosity of 1.9-3.0, preferably of 2.0-2.7, and most preferably of 2.0-2.4 (as measured on a 1% solution in 90% formic acid at 25° C.). The polyamide in the flame retardant polyamide composition according to the invention is in particular polyamide 6. Until now it had not been possible to use known halogen-free flame retardants to make a glassfibre-reinforced polyamide composition on the basis of polyamide 6 which polyamide composition has such good mechanical properties besides a V-0 rating according to UL 94 or a PLC 0 rating in a HWI test.

The polyamide composition according to the invention generally contains 5-50 mass % of glass fibres, preferably 10-40, and more preferably 20-35 mass %. Suitable glass fibres are commercially available and generally have a diameter of 5-20 µm, a cutting length of 3-10 mm, and are provided with a coating that usually contains a silane compound.

The polyamide composition according to the invention can also contain up to 30 mass % of other additives known to one skilled in the art, without this essentially detracting from the invention. Examples of such additives are colorants, processing aids, for example release agents, nucleating agents, UV stabilizers and heat stabilizers, and other mineral reinforcing agents and fillers, such as wollastonite, (calcined) clay, talc, mica, glass spheres, etc. Examples of suitable processing aids are calcium stearate, calcium montanate and bisethylene stearamide. Examples of suitable stabilizers are Irganox®1098, B1171, and CuI/KI combinations. If desired the polyamide composition also contains an auxiliary material that influences the dripping properties, for example a fluoropolymer, such as polytetrafluoroethylene.

The flame retardant polyamide composition preferably contains a flame retarder composition according to the invention which also includes an olefin copolymer, in particular a maleic anhydride-modified ethylene/alpha-olefin copolymer. More preferably the flame retardant polyamide composition according to the invention contains 1-5 mass % olefin copolymer. This has the advantage that both the fire behaviour and mechanical properties are improved further.

The polyamide composition according to the invention can be prepared in the ways known to one skilled in the art by means of mixing in the melt. For this, use is preferably made of an extruder, in particular a twin-screw extruder, that is provided with means for metering all desired components to the extruder, either in the throat of the extruder or to the melt.

The invention also relates to a moulded article containing the flame retardant polyamide composition according to the invention. Suitable processes for making a moulded article are injection moulding and extrusion.

The invention also relates to the use of the moulded article thus obtained for example in the field of electrical and electronic applications. Examples of such applications are various housings, capacitors, switches, plugs, connectors and the like.

The invention is further elucidated hereinafter on the basis of the following examples and comparative experiments.

EXAMPLES

| Materials used: | |
|---|---|
| Polyamide 6 | Akulon ® K122, relative solution viscosity 2.2, as measured at 25° C. on a 1% solution in 90% formic acid (DSM Engineering Plastics, NL) |
| Zinc dimethyl phosphinate | Sample made from dimethyl phosphinic acid and zinc acetate. |
| Aluminium dimethyl phosphinate | Sample made from dimethyl phosphinic acid and aluminium acetate. |
| Melamine polyphosphate | Melapur ® 200 (DSM Melapur, NL) |
| Melamine cyanurate | Melapur ® MC50 (DSM Melapur, NL) |
| Glass fibres | Standard glass fibre for polyamides, thickness 10 µm, cutting length 4.5 mm. |

Example I and Comparitive Experiments A-B

The polyamide compositions were made by mixing the components at approximately 260° C. on a Haake kneader or a laboratory midi-extruder (self-built). Test specimens for UL 94 tests were cut from a sheet pressed at approximately 260° C. cut with a thickness of 2 mm, or obtained by injection moulding of the polyamide compositions at approximately 260° C.

The fire behaviour of these compositions was tested according to UL 94 on test specimens of 2 mm thickness. The rating according to UL 94 is indicated by V-0 and NC (not classified).

Table 1 gives the compositions and properties for Example I and the comparative experiments A-B.

TABLE 1

| | Example I | Comparative experiment A | Comparative experiment B |
|---|---|---|---|
| Composition (mass %) | | | |
| Polyamide 6 | 50 | 50 | 42.5 |
| Zinc dimethyl phosphinate | 15 | | 12.5 |
| Melamine polyphosphate | 10 | 25 | |
| Melamine cyanurate | | | 15 |
| Glass fibres | 25 | 25 | 30 |
| Fire behaviour | | | |
| UL 94 rating (@ 2 mm) | V-0 | NC | NC |
| UL 94 1$^{st}$ combustion time (s) | 1.0 | 4.4 | 18 |
| UL 94 2$^{nd}$ combustion time (s) | 1.9 | — | 19 |

Examples II-V

The polyamide compositions were prepared by mixing the components listed in Table 2 on a W&P ZSK30 twin screw extruder, with setting temperatures at 250° C., screw speed of 250 rpm at a throughput of about 12 kg/h. Glass fibres were fed via a side feeder, other components were dosed to the throat of the extruder. The observed melt temperatures were in the range of 300-310° C.

The obtained materials were injection moulded into various test specimen using an Engel 80A machine with cylinder temperatures of 235-245° C. (from hopper to nozzle) and a mould temperature of 85° C.

Tensile properties were measured in a tensile test according to ISO 527-1.

Fire behaviour was evaluated according to UL94 on moulded test specimen of 0.8 and 1.6 mm thickness. Test results given are classification (V-0, V-1 or V-2), number of specimen that gave a V-0 result (as %), and first and second after flame times ($t_1$ and $t_2$). Glow Wire Testing was performed according to IEC 695-1 on 1.0 and 1.6 mm specimen; presented are Glow Wire Ignition Temperature (GWIT) and Glow Wire Flammability Index (GWFI) at 1 mm. Hot Wire Ignition resistance (HWI) was measured on specimen of 0.8*125*12.5 mm according to UL 746A (ASTM D3874). Results are reported as Performance Level Category (PLC). PLC 0 means no ignition during 120 s contact time, PLC 1 indicates ignition after between 60 to 120 s contact time.

From the results that are presented in Table 2 it can be concluded that all samples show favourable fire behaviour and attractive tensile and impact properties, fulfilling demands of most applications. Examples IV and V, compositions with a ratio of phosphinate compound to melamine polyphosphate of ⅔, show even better fire behaviour than examples II and III with said ratio of 1 or higher, without deterioration of other relevant properties: note especially the PLC 0 rating found for the HWI test. In this respect it is noteworthy that the importance of GWIT and especially of HWI ratings is becomer more decisive in electrical and electronic industries than the classical UL 94 tests.

TABLE 2

|  |  | Ex. II | Ex. III | Ex. IV | Ex. V |
|---|---|---|---|---|---|
| Composition |  |  |  |  |  |
| Polyamide 6 | mass % | 60 | 60 | 55 | 50 |
| Zinc dimethyl phosphinate | mass % | 7.5 | 0 | 8 | 10 |
| Al dimethyl phosphinate | mass % | 0 | 10 | 0 | 0 |
| Melamine polyphosphate | mass % | 7.5 | 5 | 12 | 15 |
| Glass fibres | mass % | 25 | 25 | 25 | 25 |
| Tensile properties |  |  |  |  |  |
| Tensile modulus | MPa | 8175 | 9450 | 8525 | 8800 |
| Tensile strength | MPa | 137 | 145 | 133 | 128 |
| Elaongation at break | % | 4.2 | 3.6 | 4.0 | 3.7 |
| UL 94 (after 48 hrs 23° C./50% RH) |  |  |  |  |  |
| @ 0.8 mm | class. | V-2 | V-2 | V-2 | V-2 |
| Number of V-0 | % | 0 | 0 | 20 | 60 |
| $t_1/t_2$ | s | 10/2 | 2.8/1.6 | 10/1.2 | 2.9/1.3 |
| @ 1.8 mm | class. | V-2 | V-0 | V-1 | V-0 |
| Number of V-0 | % | 0 | 100 | 60 | 100 |
| $t_1/t_2$ | s | 23/3 | 1/3.8 | 5.7/7 | 1/3.2 |
| UL 94 (after 168 hrs 70° C.) |  |  |  |  |  |
| @ 0.8 mm | class. | V-2 | V-0 | V-2 | V-2 |
| Number of V-0 | % | 0 | 90 | 20 | 20 |
| $t_1/t_2$ | s | 7.6/3.7 | 4.5/1.4 | 9.7/3.1 | 2.6/2.2 |
| @ 1.8 mm | class. | V-2 | V-1 | V-2 | V-0 |
| Number of V-0 | % | 0 | 0 | 60 | 100 |
| $t_1/t_2$ | s | 22/1.1 | 15/2.1 | 7.5/3 | 1.9/2.2 |
| Glow Wire Test (@ 1 mm) |  |  |  |  |  |
| GWIT | °C. | 775 | 750 | 775 | 800 |
| GWFI | °C. | 960 | 960 | 960 | 960 |
| Hot Wire Ignition (@ 0.8 mm) |  |  |  |  |  |
| HWI | PLC | 1 | 1 | 0 | 0 |

The invention claimed is:

1. Halogen-free, flame retarder composition for use in a thermoplastic composition, which comprises
   a) 10-90 mass % phosphinate compound according to formula (I)

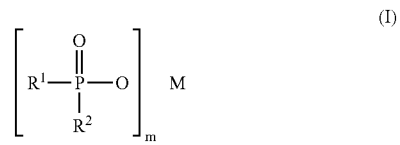

in which
   $R^1$, $R^2$ is hydrogen, a linear or branched $C_1$-$C_6$alkyl radical;
   M is an alkaline earth metal or alkali metal, Al or Zn;
   m is 1, 2 or 3; and
   b) 90-10 mass % polyphosphate salt of a 1,3,5-triazine compound according to formula (Ill),

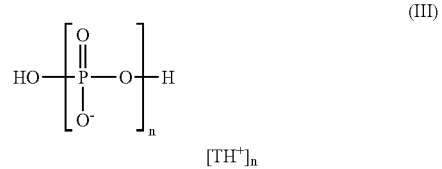

in which T represents a 1,3,5-triazine compound; and
   n is a measure of the number average degree of condensation and is higher than 3; and
   c) 1-30 mass % olefin copolymer on the basis of at least one olefin with 2-12 carbon atoms and at least one comonomer containing acid, acid anhydride or epoxy groups, said comonomer being present in a concentration of 0.1-30 mass % based on the mass of the copolymer.

2. Flame retarder composition according to claim 1, wherein n in the polyphosphate salt of a 1,3,5-triazine compound is higher than 20.

3. Flame retarder composition according to claim 1, wherein the 1,3,5-triazine compound in the polyphosphate salt of a 1,3,5-triazine compound is melamine.

4. Flame retarder composition according to claim 1, wherein the composition contains 25-75 mass % phosphinate compound and 75-25 mass % polyphosphate salt of a 1,3,5-triazine compound.

5. Flame retarder composition according to claim 1, wherein M in the phosphinate compound is Ca, Al or Zn.

6. Flame retardant polyamide composition, which comprises:

a) 95-10 mass % polyamide;
b) 0-50 mass % glass fiber;
c) 5-40 mass % flame retarder composition according to claim 1;
d) 0-50 mass % other additives.

7. Flame retardant polyamide composition according to claim 6, wherein the polyamide composition contains 10-40 mass % glass fiber.

8. Flame retardant polyamide composition according to claim 6, wherein the polyamide composition contains 10-35 mass % flame retardant composition.

9. Flame retardant polyamide composition according to claim 6, wherein the polyamide is polyamide 6.

10. Flame retardant polyamide composition according to claim 6, wherein the polyamide composition contains a flame retarder composition, which comprise
a) 10-90 mass % phosphinate compound according to formula (I);

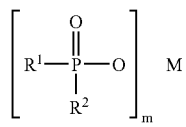

(I)

in which
$R^1$, $R^2$ is hydrogen, a linear or branched $C_1$-$C_6$ alkyl radical;

M is an alkaline earth metal or alkali metal, Al or Zn,
m is 1,2 or 3; and
b) 90-10 mass % polyphosphate salt of a 1,3,5-triazine compound according to formula (III),

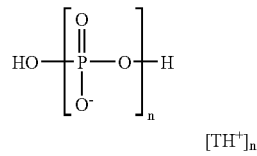

(III)

in which T represents a 1,3,5-triazine compound; and
n is a measure of the number average degree of condensation and is higher than 3; and
c) 1-30 mass % olefin copolymer;
wherein the olefin copolymer is a maleic anhydride-modified ethylene/alpha-olefin copolymer and the concentration of said maleic anhydride is 0.1-30 mass % based on the mass of said copolymer.

11. Flame retardant polyamide composition according to claim 10, wherein the polyamide composition contains 1-5 mass % olefin copolymer.

12. Molded article containing the flame retardant polyamide composition according to claim 6.

* * * * *